US 6,577,629 B1

(12) United States Patent
Kraemer

(10) Patent No.: US 6,577,629 B1
(45) Date of Patent: Jun. 10, 2003

(54) SWITCHING NETWORK WITH COMPLETE TRANSFER OF THE CONTENTS OF A HEADER FIELD OF A CELL

(75) Inventor: Rolf Kraemer, Herzogenrath (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/374,692

(22) Filed: Aug. 16, 1999

(30) Foreign Application Priority Data

Aug. 14, 1998 (DE) ......................................... 198 36 893

(51) Int. Cl.$^7$ ............................................... H04L 12/56
(52) U.S. Cl. ................................... 370/392; 370/395.31
(58) Field of Search ................................. 370/389, 392, 370/395.1, 398, 395.2, 395.21, 395.3, 395.31, 395.6, 395.7, 395.71, 395.72, 546

(56) References Cited

PUBLICATIONS

Killat et al., "A Versatile ATM Switch Concept", XIII International Switching Symposium, Stockholm, Sweden, May 27–Jun. 1, 1990, Session A6, Paper #4, Proceedings, vol. IV, pp. 127–134.

*Primary Examiner*—Hassan Kizou
*Assistant Examiner*—David Odland

(74) *Attorney, Agent, or Firm*—Daniel J. Piotrowski

(57) ABSTRACT

The invention relates to a switching network which operates in accordance with the asynchronous transfer mode and which comprises a switching unit (1), which is provided to change selected contents in the header field of a cell. For the complete transfer of the contents of a header field when specific data of the header field in the switching unit (1) are changed, a pre-processing circuit (2, 8) is coupled to each input of the switching unit (1, 10), and a post-processing circuit (3, 9) is coupled to each output of the switching unit (1, 10), upon the arrival of a cell, which is assigned to a specific virtual connection, each pre-processing circuit (2, 8) is provided to store the selected contents of the header field of the cell in an associated table if no entry is stored in connection with this virtual connection or if the stored entry deviates from the selected contents of the header field, a table is assigned to each post-processing circuit (3, 9), which table is provided to store the selected contents supplied by a pre-processing circuit (2, 8) which is associated with a virtual connection, and after the reception of a cell associated with a specific virtual connection, a post-processing circuit (3, 9) is provided to replace a selected contents of the header field of this cell by entering this virtual connection into the associated table.

5 Claims, 2 Drawing Sheets

SWITCHING NETWORK WITH COMPLETE TRANSFER OF THE CONTENTS OF A HEADER FIELD OF A CELL

BACKGROUND OF THE INVENTION

The invention relates to a switching network which operates in accordance with the asynchronous transfer mode and which comprises a switching unit which is provided in the header field of a cell to change the selected contents in the header field.

Such a switching network is known, for example, from "Killat et. al.: A versatile ATM switch concept, XIII International Switching Symposium, Stockholm, Sweden, May 27–Jun. 1, 1990, Session A6, Paper #4, Proceedings, Vol. IV, pp. 127–134". Cells arriving at an input of the switching network are fed to a translation circuit, which interprets information in the header field of a cell and at least partly replaces this information with new values. After said translation, a cell is supplied to the input of a switching block, which leads the cell to at least a specific output of the switching block. In many applications, often not the entire contents of a header field of a cell is guided from the input to the output of the switching network. Specific bits in the header field are used, for example, for internal information.

SUMMARY OF THE INVENTION

It is an object of the invention to provide a switching network which, in spite of the change in specific information in the header field of a cell, makes the entire information of the header field of the cell available at the output of the switching network.

The object in accordance with the invention is achieved by a switching device of the type mentioned in the opening paragraph, in that a pre-processing circuit is coupled to each input of the switching unit, and a post-processing circuit is coupled to each output of the switching unit, upon the arrival of a cell, which is assigned to a specific virtual connection, each pre-processing circuit is provided to store the selected contents of the header field of the cell in an associated table if no entry is stored in connection with this virtual connection or if the stored entry deviates from the selected contents of the header field, a table is assigned to each post-processing circuit, which table is provided to store the selected contents supplied by a pre-processing circuit which is associated with a virtual connection, and after the reception of a cell associated with a specific virtual connection, a post-processing circuit is provided to replace a selected contents of the header field of this cell by entering this virtual connection into the associated table.

In accordance with the invention, a pre-processing circuit is provided which is used to check whether an associated table already contains an entry with a selected contents of the header field of this cell. The selected contents should at least comprise the bits of the header field which are changed in the subsequent header field. If the table does not contain an entry or if an entry associated with this virtual connection of the cell is not identical to the selected contents of the header field, then this contents is stored in the table. After a cell associated with a specific virtual connection is received in the post-processing circuit, the contents stored in the table replaces the corresponding contents in the header field of the received cell. A table associated with a pre- or post-processing circuit may either be a constituent of said pre- or post-processing circuit or an independent switching element. By the addition of the pre- and post-processing circuit and the substitution of specific bits in the header field, the switching block provides, in spite of a change of specific bits in the header field, a cell comprising the information of the post-processing circuit which was available prior to the entry into the switching unit. In this respect, it is to be noted, however, that a change of specific VCI and VPI values characterizing the virtual connection and resulting from a translation in the switching unit should not be interpreted as a change in the contents of the header field.

In claim 2 a description is given of a further function of the pre-processing circuit. This pre-processing circuit does not only store the selected contents of a header field but also causes said contents to be supplied to at least one post-processing circuit by means of a cell. The evaluation of this cell received from a post-processing circuit is explained in claim 3. Claim 4 describes an alternative to the supply of the selected contents of a header field to at least one table of a post-processing circuit.

An embodiment of the switching unit in which the number of inputs and outputs of the switching unit can be increased in a simple manner is indicated in claim 5.

BRIEF DESCRIPTION OF THE DRAWINGS

These and other aspects of the invention are apparent from and will be elucidated with reference to the embodiments described hereinafter.

In the drawings.

DETAILED DESCRIPTION OF THE PREFERRED EMBODIMENTS

Figure 1:
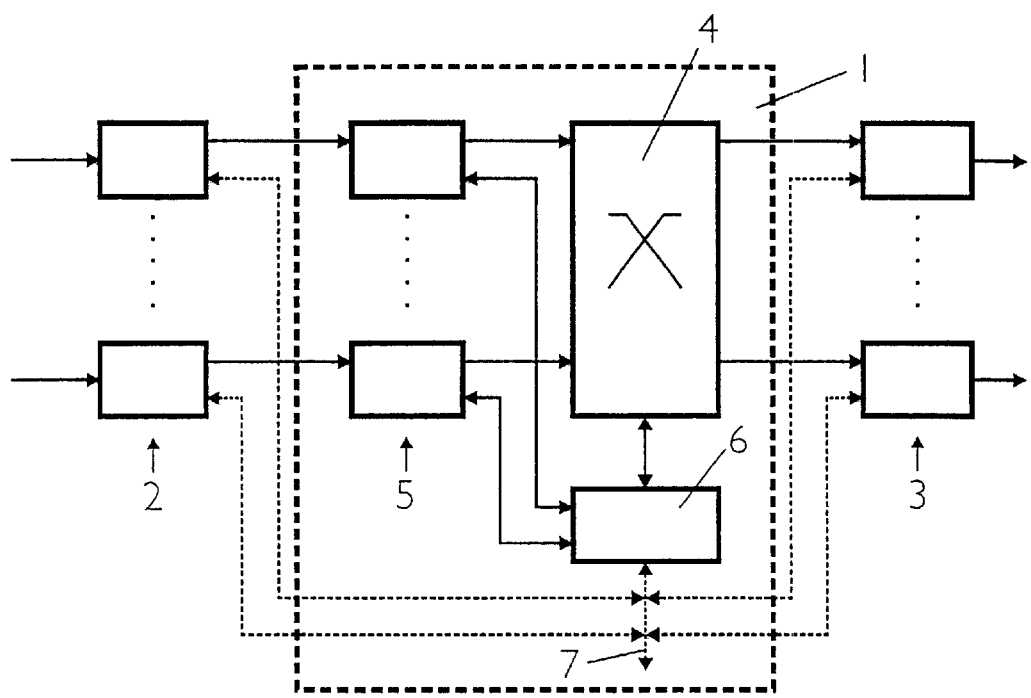
FIG. 1 shows an embodiment of a switching network which operates in accordance with the asynchronous transfer mode (ATM)

FIG. 1 shows an example of a switching network which operates in accordance with the asynchronous transfer mode (ATM), and which comprises a switching unit 1 and a plurality of pre-processing circuits 2 and a plurality of post-processing circuits 3. The switching unit 1 comprises a switching block 4, a plurality of translation circuits 5 and a control circuit 6. Each input of the switching block 4 is coupled to a translation circuit 5, and each output of the switching block 4 is coupled to a post-processing circuit 3. Each translation circuit 5 is coupled to a pre-processing circuit 2. The inputs of the switching network form the inputs of the pre-processing circuits 2, and the outputs of the switching network form the outputs of the post-processing circuits 3. The control circuit 6, which serves, in particular, to control the switching block, is coupled to each translation circuit 5 and, if necessary, via an external bus system 7 (represented by an interrupted line), to the pre- and post-processing circuits 2 and 3.

The switching network shown in FIG. 1 is, for example, part of a network which comprises further switching networks and terminals. Such a network operating in accordance with the asynchronous transfer mode (ATM) can suitably be used for all service categories, for example speech transfer, distribution of video signals, and data communication. The messages or information to be transferred by means of the asynchronous transfer mode are packed in packages of equal length (cells), so that the network only transfers similar packages, independent of the service category or application applied. A cell comprises a header field with 5 bytes, which contains path and control information, and an information field with 48 bytes, which contains data.

Prior to the message or information transfer (data transfer) a virtual connection must be built up, and after the data transfer said virtual connection must be disconnected, which is referred to as signaling. For this purpose, an agreement is made between the terminal (user side) and the network (network side) as regards the desired transfer properties, such as bandwidth, error rate and delay time.

To transfer the signaling information use is made of cells which are referred to as control cells. After a connection set-up, i.e. when a virtual channel has been made available for the transfer between two terminals, the useful/payload data are transported via cells which are referred to as payload cells. The two cell types can be distinguished by means of a specific information in the header field of a cell.

Certain bits in the header field of a cell are reserved for the VCI (virtual channel identifier). This denotes a virtual connection. Besides, certain bits in the header field of the cell are reserved for the VPI (virtual path identifier), which denotes a beam of a number of virtual connections. For the VPI, 8 to 12 bits are provided in the header field, and for the VCI, 16 bits are provided.

The VCI and VPI in the header field of an arriving cell are changed in a switching network, i.e. they are given a different VCI and VPI value. This is referred to as translation. In the example of the switching network in accordance with FIG. 1, such a translation function is carried out by the translation circuits 5. During the connection set-up, a higher-order management system of the network sends control cells to the control circuit 6 of the switching unit 1, which control cells contain, inter alia, data about VCI and VPI values. After the control circuit has received such control cells, said control circuit stores, in a table of a translation circuit 5, the VCI and VPI values which arriving cells may have, and the VCI and VPI values which the cell to be transferred obtains instead of the old VCI and VPI values.

In the following, the assumption is made that the switching block 4 in the example shown in FIG. 1 changes a few bits in the header field of a cell. However, to make sure that the entire information of the header field, which is available before a cell enters the switching unit, is also available to the network after the cell has left the switching unit 1, in accordance with the invention, the pre-processing circuits 2 and the post-processing circuits 3 are connected to the switching unit 1.

The pre- and post-processing circuits 2 and 3 may be embodied, for example, as state machines. A pre-processing circuit 2 includes a table in which the contents of the corresponding header field is stored for a specific virtual connection (i.e. for a VCI and VPI value). If a payload cell arrives in a pre-processing circuit 2, it is checked whether the contents of the header field of this virtual connection has been stored in the table of the pre-processing circuit 2. If so, the payload cell is transferred. If no entry exists yet in the table, or if the contents of the header field differs from the contents stored in the table, further actions are carried out by the preprocessing circuit 2. A control cell, hereinafter referred to as leading control cell, which is supplied to the switching unit 1. Said control cell contains, in its information field, the complete contents of the header field of the checked cell. If the table of the pre-processing circuit 2 does not yet contain an entry of said checked cell, a new entry is generated in the table or a table entry is updated when the contents of the header field of the checked cell differs from the contents stored in the table. Subsequently, the checked cell is sent to the switching unit 1. The switching block 4 takes away the destination of a cell by evaluating the VCI and VPI values. The destination of a leading control cell, which is supplied by a pre-processing circuit 2, is a post-processing circuit 3. A post-processing circuit 3 also comprises a table wherein the contents of the corresponding header field is stored for a specific virtual connection. After arrival of a leading control cell, the contents of this control cell is stored in the table of the post-processing circuit 3. If payload cells are received from a post-processing circuit 3, then this circuit substitutes the contents of the header field of the arriving payload cell with the contents of this virtual connection stored in the table of the post-processing circuit 3, which virtual connection is characterized by the VCI and VPI value. This form of transfer, wherein first a leading control cell with the contents of the header field of the associated payload cell is transferred and then the actual payload cell is transferred from a pre-processing circuit 2 to a post-processing circuit 3, is referred to as transparent transfer of payload cells.

It is noted that the contents of a header cell in a table of the pre-processing circuit and the contents of the table of a post-processing circuit may be different as a result of the translation in a translation circuit 5 of the VCI and/or VPI values. However, the remaining bits of the contents stored in the tables are identical. Thus, the contents of a header field is to be taken to mean all the bits which are not assigned to the VCI and/or VPI. This means that the VCI values or the VPI values, or the VPI and VCI values serve as table address for the contents of a header cell.

As is customary in other virtual connections, the transfer of a leading control cell requires a connection set-up, customary in ATM systems, between a pre-processing circuit 2 and a post-processing circuit 3. Use is made here, as mentioned above, of the control cells necessary for signaling.

Instead of updating the table of a post-processing circuit 3 by supplying a leading control cell, this may be achieved with the aid of the control circuit 6. For this purpose, the contents of the header field of a virtual connection of a pre-processing circuit 2 is supplied to the control circuit 6 via the bus system 7. The control circuit 6 inserts this information in the table of a post-processing circuit 3 and thereby updates its table contents.

Figure 2:
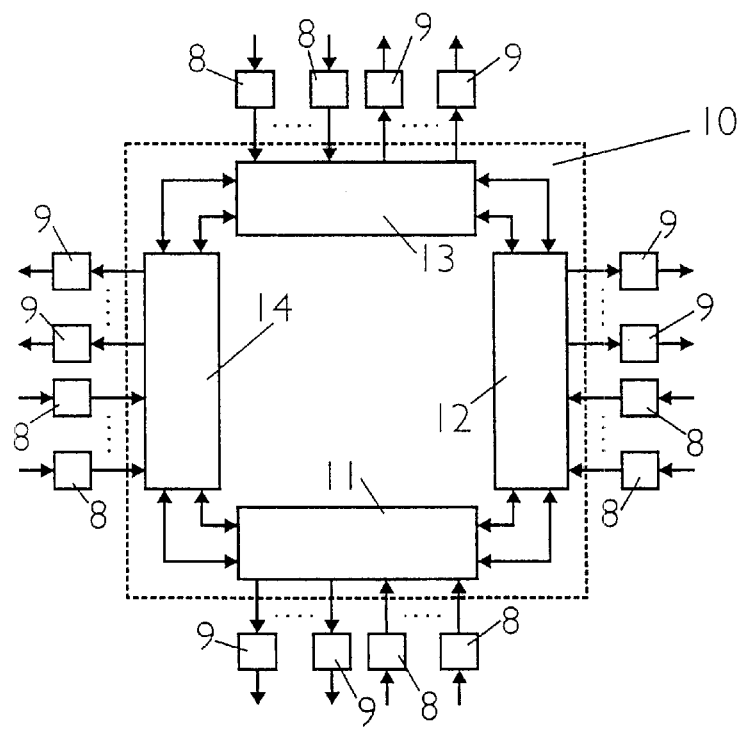
FIG. 2 shows a further example of a switching network.
Figure 3:
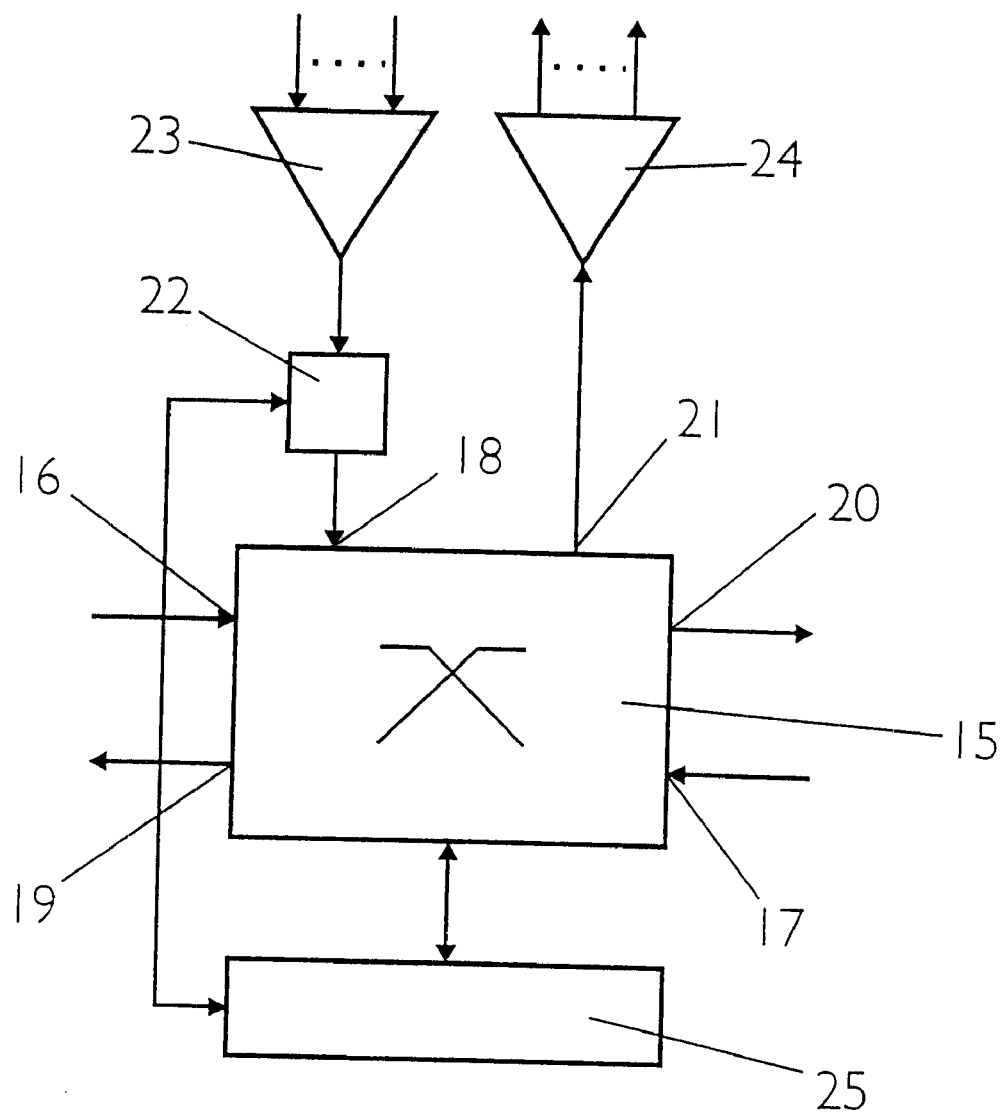
FIG. 3 shows the principal structure of a switching component to be used in FIG. 2.

FIG. 2 shows a further example of a switching network comprising a plurality of pre- and post-processing circuits 8 and 9, and a switching unit 10. In this example, the switching unit 10 includes four switching components 11 to 14 which are arranged in a double ring. Such a switching component 11 to 14 may be the "single-chip ATM-switching component CMC155" (single-chip ATM switch) which is manufactured by Philips. The principal structure of such a switching component 11 to 14 is shown in FIG. 3. A switching block 15 has three inputs 16 to 18 and three outputs 19 to 21. Both inputs 16 and 17 and both outputs 19 and 20 of the switching block 15 form ring connections and are connected to ring connections of switching blocks of other switching components. The input 18 is coupled via a translation circuit 22 to a multiplexer 23 to the inputs of which pre-processing circuits 8 are connected. The output 21 of the switching block 15 is coupled via a demultiplexer 24 to post-processing circuits 9. In addition, the switching component comprises a control circuit 25 which serves to control the switching block 15 and which is connected to the translation circuit 22. If necessary, the control circuit 25 may be connected, via lines, to the corresponding pre- and post-processing circuits 8 and 9.

The operation of the switching unit 10 shown in FIG. 2 is similar to that of the switching unit shown in FIG. 1. This switching unit may be readily extended however with new inputs and outputs by adding a switching component.

What is claimed is:

1. A switch network which operates in accordance with the asynchronous transfer mode, comprising: a switching unit (1, 10) for changing selected contents in the header field of a cell, characterized in that a pre-processing circuit (2, 8) is coupled to each input of the switching unit (1, 10), and a post-processing circuit (3, 9) is coupled to each output of the switching unit (1, 10), upon the arrival of a cell, which is assigned to a specific virtual connection, each pre-processing circuit (2, 8) is provided to store the selected contents of the header field of the cell in an associated table if no entry is stored in connection with this virtual connection or if a stored entry in the associated table deviates from the selected contents of the header field, a table is assigned to each post-processing circuit (3, 9), which table is provided to store the selected contents supplied by a pre-processing circuit (2, 8) which is associated with a virtual connection, and after a cell associated with a specific virtual connection is received in a post-processing circuit (3, 9), a selected contents of the header field of this cell is replaced by the selected contents stored in the table.

2. A switching network as claimed in claim 1, characterized in that a pre-processing circuit (2, 8) not only serves to store the selected contents of a header field in the associated table but also to generate a cell which contains the selected contents of the header field and that the pre-processing circuit (2, 8) is provided to send this cell, via the switching unit (1, 10) to at least a post-processing circuit (3, 9).

3. A switching network as claimed in claim 1, characterized in that a post-processing circuit (3, 9) is provided to receive a cell with the selected contents of a header field, and to store this contents in the associated table.

4. A switching network as claimed in claim 1, characterized in that a pre-processing circuit (2) not only serves to store the selected contents of a header field in the associated table but also to supply this contents, via a bus system (7) controlled by a control circuit (6) for controlling the switching unit (1), to at least one associated table of a post-processing circuit (9).

5. A switching network as claimed in claim 1, characterized in that the switching unit (10) comprises a plurality of switching components (11 to 14) which are arranged in a ring, and which each comprise a switching block (15) with ring inputs (16, 17) and ring outputs (19, 20), and a further input (18) and a further output (21), a translation circuit (22) connected to the further input (18), a multiplexer (23) which is coupled to the translation circuit (22) and which serves to receive cells from pre-processing circuits (8), a demultiplexer (24) which is coupled to the further output (21) and which serves to supply cells to the post-processing circuit (9), and a control circuit (25) which at least serves to control the switching block (15).

* * * * *